(12) United States Patent
Sueyoshi et al.

(10) Patent No.: US 8,003,736 B2
(45) Date of Patent: Aug. 23, 2011

(54) SILICON-CONTAINING COMPOUND, CURABLE COMPOSITION AND CURED PRODUCT

(75) Inventors: Takashi Sueyoshi, Tokyo (JP); Ken-ichiro Hiwatari, Tokyo (JP); Tadashi Janado, Tokyo (JP); Yoshikazu Shoji, Tokyo (JP); Seiichi Saito, Tokyo (JP); Yoshitaka Sugawara, Hyogo (JP)

(73) Assignee: Adeka Corporation, Tokyo (JP)

( * ) Notice: Subject to any disclaimer, the term of this patent is extended or adjusted under 35 U.S.C. 154(b) by 19 days.

(21) Appl. No.: 12/596,933

(22) PCT Filed: Apr. 21, 2008

(86) PCT No.: PCT/JP2008/057665
§ 371 (c)(1),
(2), (4) Date: Mar. 8, 2010

(87) PCT Pub. No.: WO2008/133229
PCT Pub. Date: Nov. 6, 2008

(65) Prior Publication Data
US 2010/0179283 A1    Jul. 15, 2010

(30) Foreign Application Priority Data

Apr. 23, 2007  (JP) .................................. 2007-112738

(51) Int. Cl.
*C08F 283/00* (2006.01)
(52) U.S. Cl. ............ 525/478; 525/479; 528/31; 528/32; 528/37
(58) Field of Classification Search .................... 524/588
See application file for complete search history.

(56) References Cited

U.S. PATENT DOCUMENTS

| | | | |
|---|---|---|---|
| 5,545,837 | A | 8/1996 | Kobayashi |
| 5,563,803 | A | 10/1996 | Morihara et al. |
| 2005/0080154 | A1 | 4/2005 | Tabei |
| 2005/0256286 | A1 | 11/2005 | Asch et al. |
| 2006/0074212 | A1 | 4/2006 | Chapman et al. |
| 2006/0111491 | A1 | 5/2006 | Asch et al. |
| 2006/0116500 | A1 | 6/2006 | Chapman et al. |
| 2006/0134440 | A1 * | 6/2006 | Crivello ........................ 428/447 |

FOREIGN PATENT DOCUMENTS

| | | |
|---|---|---|
| JP | 7-309950 | 11/1995 |
| JP | 8-53661 | 2/1996 |
| JP | 11001560 A * | 1/1999 |
| JP | 2005-133073 | 5/2005 |
| JP | 2005-523980 | 8/2005 |
| JP | 2005-529989 | 10/2005 |
| JP | 2005-325174 | 11/2005 |
| JP | 2006-511645 | 4/2006 |
| JP | 2006-511646 | 4/2006 |
| WO | 03/093349 | 11/2003 |
| WO | WO 2006/090609 | 8/2006 |

OTHER PUBLICATIONS

European Search Report—08740710.2—Jul. 5, 2010 Nippon Kagake Kaishi—The Chemical Society of Japan—No. 9, 571—Sep. 10, 1998.
International Search Report, PCT/JP2008/057665, Jul. 22, 2008.

* cited by examiner

*Primary Examiner* — Marc Zimmer
*Assistant Examiner* — Lindsay Nelson
(74) *Attorney, Agent, or Firm* — Young & Thompson

(57) ABSTRACT

A silicon-containing compound of formula (1), and a curing composition containing a silicon-containing compound of formula (1) wherein Z is hydrogen, a silicon-containing compound of formula (1) wherein Z is C2-C4 alkenyl or alkynyl and a hydrosilylation catalyst. The composition has excellent handling and curing properties and provides a cured product with excellent heat resistance and flexibility.

In formula (1), $R^a$-$R^g$=C1-C12 saturated aliphatic hydrocarbon group or C6-C12 aromatic hydrocarbon group. $R^e$ and $R^f$ do not simultaneously represent C1-C12 saturated aliphatic hydrocarbon group; Y=C2-C4 alkylene; Z=hydrogen or C2-C4 alkenyl or alkynyl; K is 2-7; T is 1-7; P is 0-3; and M and N are numbers selected such that N:M=1:1 to 1:100, that all M's and N's total at least 15, and that the mass average molecular weight of the compound of formula (1) is 3,000 to 1,000,000.

17 Claims, No Drawings

SILICON-CONTAINING COMPOUND, CURABLE COMPOSITION AND CURED PRODUCT

TECHNICAL FIELD

This invention relates to a novel silicon-containing compound having a specific structure, a curing composition containing the compound, and a cured product obtained by curing the composition. More particularly, it relates to a silicon-containing compound that provides a curing composition having excellent handling properties and curing properties and providing a cured product with high heat resistance and flexibility; a curing composition containing the compound; and a cured product having high heat resistance and flexibility.

BACKGROUND ART

Composites of an organic material and an inorganic material have been under various studies. Compounding an inorganic filler into an organic polymer, modifying a metal surface by coating with an organic polymer, and like techniques have been made use of on an industrial scale. When combined into a composite, the organic and inorganic materials admittedly bring about unexpected improvement on certain physical properties. Nevertheless, because the individual materials composing an organic-inorganic composite are sized on the order of micrometer or greater, improvement on many other physical properties and performance properties that can be obtained by their combination is nothing more than the levels predictable from the performance and physical properties of the constituent materials based on the addition rule.

Recently, there has been an increase of research into organic-inorganic composites in which organic and inorganic materials are combined with their domain sizes of the order of nanometer or even on molecular level. Such composites are promising for exhibiting not only the characteristics and merits inherent to the individual materials but also new functionality that is quite different from the functions of the individual materials and therefore unpredictable by the addition rule.

Such organic-inorganic composites include chemically bonded composites in which one of the constituent materials is bonded to the other on molecular level via a covalent bond and dispersed composites in which one of the materials is finely dispersed in the other (matrix). A sol gel process is widely utilized to synthesize inorganic materials for use in these organic-inorganic composites. A sol gel process is a technique for obtaining a crosslinked inorganic oxide at low temperatures, in which precursor molecules are hydrolyzed followed by polycondensation. The problem of the inorganic materials prepared by the sol gel process is poor storage stability such that gelation occurs in a short time.

Non-patent document 1 reports an attempt to improve storage stability with attention focused on dependence of the condensation reaction rate of an alkyltrialkoxysilane on the alkyl chain length. According to the report, polycondensation of methyltrimethoxysilane is followed by adding a long-chain alkyltrialkoxysilane having a low condensation reaction rate thereby to block the silanol groups of the polysiloxane. The report also teaches that methyltrimethoxysilane is polycondensed using an aluminum catalyst and, when a predetermined molecular weight is reached, acetylacetone is added to the reaction system thereby to cause a ligand exchange reaction in the system. However, these methods are still insufficient for improving the storage stability. Furthermore, inorganic materials synthesized by a sol-gel process have a disadvantage of poor flexibility.

On the other hand, a curing composition containing a specific silicon-containing polymer has been proposed as a chemically bonded organic-inorganic composite. For example, patent document 1 discloses a silicon-containing curing composition which comprises (A) a silicon-containing polymer having a crosslinked structure and an alkyl or alkynyl group, (B) a silicon-containing polymer having a crosslinked structure and a silane group, and (D) a platinum catalyst, exhibits good handling properties and curing properties, and provides a cured product with high heat resistance. However, the silicon-containing curing composition does not necessarily have sufficient curing characteristics, failing to produce a cured product with sufficient performance at a low temperature in a short time.

Non-patent document 1: The Chemical Society of Japan, *Nippon Kagaku Kaishi* (*Bulletin of the Chemical Society of Japan*), No. 9, 571 (1998)

Patent document 1: JP 2005-325174A

DISCLOSURE OF THE INVENTION

Problem to be Solved by the Invention

An object of the invention is to provide a silicon-containing curing composition having excellent handling properties and curing properties and providing a cured product excellent in heat resistance and flexibility.

Means for Solving the Problem

As a result of extensive investigations, the present inventors have found that the object of the invention is accomplished by a silicon-containing compound having a specific structure and a curing composition containing the compound. The invention has been completed based on these findings.

The invention provides a silicon-containing compound represented by general formula (1):

[Chemical Formula 1]

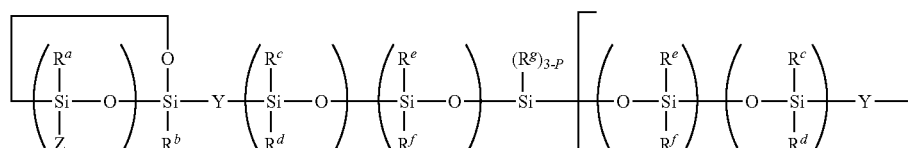
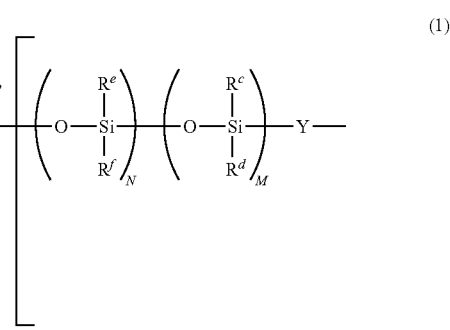

(1)

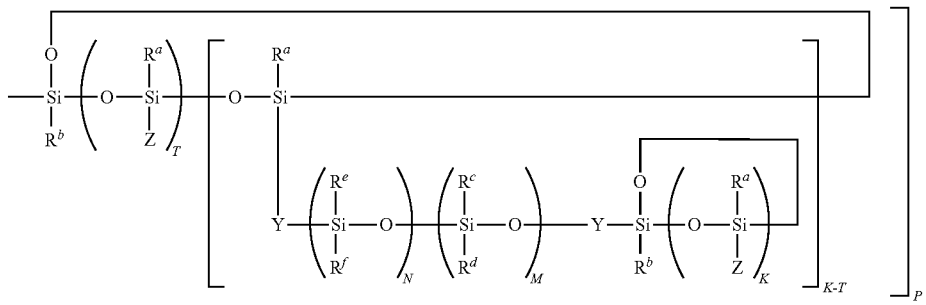

wherein $R^a$, $R^b$, $R^c$, $R^d$, $R^e$, $R^f$, and $R^g$, which may be the same or different, each represent a saturated aliphatic hydrocarbon group having 1 to 12 carbon atoms or an aromatic hydrocarbon group optionally substituted with a saturated aliphatic hydrocarbon group and having 6 to 12 carbon atoms, provided that $R^e$ and $R^f$ do not simultaneously represent a saturated aliphatic hydrocarbon group having 1 to 12 carbon atoms; Y represents an alkylene group having 2 to 4 carbon atoms; Z represents a hydrogen atom or an alkenyl or alkynyl group having 2 to 4 carbon atoms; K represents a number of 2 to 7; T represents a number of 1 to 7; the unit recurring T times and the unit recurring (K-T) times may be bonded to each other blockwise or randomly; P represents a number of 0 to 3; M and N represent numbers selected such that N:M ranges from 1:1 to 1:100, that all M's and N's total at least 15, and that the silicon-containing compound represented by general formula (1) has a mass average molecular weight of 3,000 to 1,000,000; and the unit recurring M times and the unit recurring N times may be bonded to each other blockwise or randomly.

The invention also provides a curing composition containing (A1) a silicon-containing compound of general formula (1) in which Z is a hydrogen atom, (B1) a silicon-containing compound of general formula (1) in which Z is an alkenyl or alkynyl group having 2 to 4 carbon atoms, and (C) a catalyst for hydrosilylation.

The invention also provides a cured product obtained by curing the curing composition of the invention.

BEST MODE FOR CARRYING OUT THE INVENTION

The silicon-containing compound of the invention, which is represented by general formula (1), is described in detail.

In general formula (1), examples of the saturated aliphatic hydrocarbon group having 1 to 12 carbon atoms as represented by $R^a$, $R^b$, $R^c$, $R^d$, $R^e$, $R^f$, and $R^g$ include methyl, ethyl, propyl, isopropyl, butyl, sec-butyl, tert-butyl, isobutyl, amyl, isoamyl, tert-amyl, hexyl, 2-hexyl, 3-hexyl, cyclohexyl, 1-methylcyclohexyl, heptyl, 2-heptyl, 3-heptyl, isoheptyl, tert-heptyl, n-octyl, isooctyl, tert-octyl, 2-ethylhexyl, nonyl, isononyl, decyl, and dodecyl.

The aromatic hydrocarbon group which is optionally substituted with a saturated aliphatic hydrocarbon group and has 6 to 12 carbon atoms as represented by $R^a$, $R^b$, $R^c$, $R^d$, $R^e$ $R^f$, and $R^g$ contains a total of 6 to 12 carbon atoms inclusive of the carbon atoms of the saturated aliphatic hydrocarbon group as a substituent. The saturated aliphatic hydrocarbon group as a substituent may be chosen from, for example, those recited above within a range that satisfies the carbon atom number limitation described. Therefore, examples of the aromatic hydrocarbon group optionally substituted with a saturated aliphatic hydrocarbon group and having 6 to 12 carbon atoms as represented by $R^a$, $R^b$, $R^c$, $R^d$, $R^e$, $R^f$, and $R^g$ include phenyl, naphthyl, 2-methylphenyl, 3-methylphenyl, 4-methylphenyl, 3-isopropylphenyl, 4-isopropylphenyl, 4-butylphenyl, 4-isobutylphenyl, 4-tert-butylphenyl, 4-hexylphenyl, 4-cyclohexylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, cyclohexylphenyl, biphenyl, and 2,4,5-trimethylphenyl.

Examples of the alkylene group having 2 to 4 carbon atoms as represented by Y include —$CH_2CH_2$—, —$CH_2CH_2CH_2$—, —$CH_2CH_2CH_2CH_2$—, —$CH(CH_3)CH_2$—, and —$CH_2CH(CH_3)$—.

Examples of the alkenyl group having 2 to 4 carbon atoms as represented by Z include $CH_2$=CH—, $CH_2$=CH—$CH_2$—, $CH_2$=CH—$CH_2$—$CH_2$—, $CH_2$=$C(CH_3)$—, $CH_2$=$C(CH_3)$—$CH_2$—, and $CH_2$=CH—$CH(CH_3)$—.

Examples of the alkynyl group having 2 to 4 carbon atoms as represented by Z include the groups shown below.

[Chemical Formula 2]

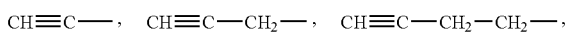

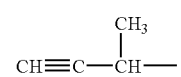

Of the silicon-containing compounds represented by general formula (1) preferred are those represented by general formula (2) shown below. The silicon-containing compounds of general formula (2) are equivalent to the compounds of general formula (1) in which T=K. The silicon-containing compound as obtained by ordinary synthesis is the compound of general formula (2) or a mixture containing the compound of general formula (2) as a main component and other several compounds of general formula (1). For example, even when a polyfunctional cyclopolysiloxane represented by $(R^aSiHO)_K$ is used as a component introducing a cyclopolysiloxane ring, production of a compound of formula (1) wherein (K-T)>1 is slight. This is because formation of a compound in which an acyclic polysiloxane is bonded to two or more Si—H moieties of a cyclopolysiloxane via Y is energetically disfavored.

[Chemical Formula 3]

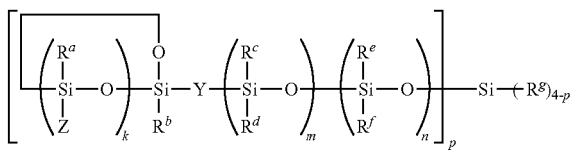

(2)

wherein $R^a$, $R^b$, $R^c$, $R^d$, $R^e$, $R^f$, and $R^g$, which may be the same or different, each represent a saturated aliphatic hydrocarbon group having 1 to 12 carbon atoms or an aromatic hydrocarbon group optionally substituted with a saturated aliphatic hydrocarbon group and having 6 to 12 carbon atoms, provided that $R^e$ and $R^f$ do not simultaneously represent a saturated aliphatic hydrocarbon group having 1 to 12 carbon atoms; Y represents an alkylene group having 2 to 4 carbon atoms; Z represents a hydrogen atom or an alkenyl or alkynyl group having 2 to 4 carbon atoms; k represents a number of 2 to 7; p represents a number of 1 to 4; m and n represent numbers selected such that n:m ranges from 1:1 to 1:100, that m+n is equal to or greater than 15, and that the silicon-containing compound represented by general formula (2) has a mass average molecular weight of 3,000 to 1,000,000; and the unit recurring m times and the unit recurring n times may be bonded to each other blockwise or randomly.

In general formulae (1) and (2), as the proportion of the C1-C12 saturated aliphatic hydrocarbon groups in $R^a$ through $R^g$ increases, flexibility of a resulting cured product is improved. As the proportion of the C6-C12 aromatic hydrocarbon group optionally substituted with a saturated aliphatic hydrocarbon group in $R^a$ through $R^g$ increases, heat resistance and hardness of a resulting cured product are improved. Accordingly, the ratio of the saturated aliphatic hydrocarbon groups and the aromatic hydrocarbon groups is decided as appropriate to the physical properties required of a cured product. The ratio of the number of the saturated aliphatic hydrocarbon groups to the number of the aromatic hydrocarbon groups is preferably 100:1 to 1:2, more preferably 20:1 to 1:1. The C1-C12 saturated aliphatic hydrocarbon group is preferably a methyl group in terms of heat resistance. The C6-C12 aromatic hydrocarbon group optionally substituted with a saturated aliphatic hydrocarbon group is preferably a phenyl group in terms of heat resistance.

Preferred of the compounds of general formulae (1) or (2) are those in which each of $R^c$ and $R^d$ is a C1-C12 saturated aliphatic hydrocarbon group, especially a methyl group, and at least one of $R^e$ and $R^f$ is a C1-C12 aromatic hydrocarbon group optionally substituted with a saturated aliphatic hydrocarbon group, especially a phenyl group.

In general formula (2), k is 2 to 7. If it is greater than 7, the number of functional groups is too large to provide a flexible cured product. The symbol k is preferably 2 to 5 in view of industrial availability of the starting material and adequacy of the number of the functional groups. The symbol k is more preferably 3.

The silicon-containing compound of the invention has a mass average molecular weight of 3,000 to 1,000,000. If it is less than 3,000, the resulting cured product has insufficient heat resistance. If it is more than 1,000,000, the compound has too high a viscosity, which is disadvantageous for handling. The mass average molecular weight of the compound is preferably 5,000 to 500,000, more preferably 10,000 to 100,000.

The silicon-containing compound of the invention is not limited in terms of its production process and may be produced utilizing known reactions. The process of producing the compounds of the invention will be described taking the compounds of general formula (2) as a representative. The process will be described in this order: the compound of formula (2) wherein Z is a hydrogen atom and the compound of formula (2) wherein Z is an alkenyl or alkynyl group having 2 to 4 carbon atoms.

In what follows, a compound of general formula (1) or (2) wherein Z is hydrogen will be referred to as a silicon-containing compound (A1) or (A2), respectively; and a compound of general formula (1) or (2) wherein Z is alkenyl or alkynyl will be referred to as a silicon-containing compound (B1) or (B2), respectively.

The process of producing a silicon-containing compound (A2) (i.e., a compound of formula (2) wherein Z=H) is as follows.

A silicon-containing compound (A2) is obtained by, for example, starting with (a1) an acyclic polysiloxane compound having an unsaturated bond as a precursor, which is caused to react with (a2) a cyclic polysiloxane compound.

The acyclic polysiloxane compound (a1) having an unsaturated bond is obtainable by condensing at least one bifunctional silane compound by hydrolysis, allowing the condensate to react with a monofunctional, trifunctional or tetrafunctional monosilane compound in the case where p is 1, 3 or 4, respectively, and allowing the reaction product to react with a monofunctional silane compound having an unsaturated group. In the case where p is 2, the compound (a1) is obtained by allowing the condensate to react with a monofunctional silane compound having an unsaturated group. The functional group of these silane compounds is typically exemplified by an alkoxy group, a halogen atom, and a hydroxyl group. The acyclic polysiloxane compound (a1) having an unsaturated bond and the cyclic polysiloxane compound (a2) are bonded to each other through the reaction between the unsaturatedly bonded carbon atom of (a1) and the Si—H group of (a2).

Examples of the bifunctional silane compound that can be used in the preparation of the acyclic polysiloxane compound (a1) having an unsaturated bond include dialkoxymonosilane compounds, such as dimethyldimethoxysilane, dimethyldiethoxysilane, diphenyldimethoxysilane, diphenyldiethoxysilane, methylphenyldimethoxysilane, and methylphenyldiethoxysilane; monosilane compounds derived from these dialkoxymonosilane compounds by displacing at least one of the alkoxy groups with a halogen atom selected from the group consisting of fluorine, chlorine, bromine, and iodine or a hydroxyl group; and di- or oligosiloxane compounds having two or more molecules of the monosilane compounds condensed.

Examples of the monofunctional mono silane compounds include monoalkoxysilane compounds, such as trimethylethoxysilane, trimethylmethoxysilane, triphenylethoxysilane, triphenylmethoxysilane, methyldiphenylethoxysilane, and dimethylphenylethoxysilane; and monosilane compounds derived from the monoalkoxysilane compounds by displacing the alkoxy group with a halogen atom selected from the group consisting of fluorine, chlorine, bromine, and iodine or a hydroxyl group.

Examples of the trifunctional monosilane compounds include trisalkoxysilane compounds, such as trisethoxymethylsilane, trismethoxymethylsilane, trisethoxyphenylsilane, and trismethoxyphenylsilane; and monosilane compounds derived from these trisalkoxysilane compounds by displacing at least one of the alkoxy groups with a halogen atom selected from the group consisting of fluorine, chlorine, bromine, and iodine or a hydroxyl group.

Examples of the tetrafunctional monosilane compounds include tetrakisalkoxysilane compounds, such as tetrakisethoxysilane and tetrakismethoxysilane; and monosilane compounds derived from these tetrakisalkoxysilane compounds by displacing at least one of the alkoxy groups with a halogen atom selected from the group consisting of fluorine, chlorine, bromine, and iodine or a hydroxyl group.

Examples of the monofunctional silane compound having an unsaturated group are dimethylvinylchlorosilane, dimethylvinylmethoxysilane, dimethylvinylethoxysilane, diphenylvinylchlorosilane, diphenylvinylethoxysilane, diphenylvinylmethoxysilane, methylphenylvinylchlorosilane, methylphenylelthoxysilane, and methylphenylmethoxysilane.

Examples of the cyclic polysiloxane compound (a2) include 1,3,5-trimethylcyclotrisiloxane, 1,3,5,7-tetramethylcyclotetrasiloxane, 1,3,5,7,9-pentamethylcyclopentasiloxane, 1,3,5,7,9,11-hexamethylcyclohexasiloxane, 1,3,5,7,9,11,13-heptamethylcycloheptasiloxane, 1,3,5,7,9,11,13,15-octamethyl-cyclooctasiloxane, 1,3,5-triethylcyclotrisiloxane, 1,3,5,7-tetraethylcyclotetrasiloxane, 1,3,5,7,9-pentaethylcyclopentasiloxane, 1,3,5,7,9,11-hexaethylcyclohexasiloxane, 1,3,5-triphenylcyclotrisiloxane, 1,3,5,7-tetraphenylcyclotetrasiloxane, 1,3,5,7,9-pentaphenylcyclopentasiloxane, and 1,3,5,7,9,11-hexaphenylcyclohexasiloxane.

When starting with the bifunctional silane compound, monofunctional monosilane compound, trifunctional monosilane compound, tetrafunctional monosilane compound, monofunctional silane compound having an unsaturated group, or cyclic polysiloxane compound (a2) with part of or the whole of the hydrogen atoms thereof replaced with deuterium and/or fluorine, there is produced a silicon-containing compound of the invention with part of or the whole of its hydrogen atoms replaced with deuterium and/or fluorine as will be described infra.

The condensation reaction by hydrolysis for obtaining the acyclic polysiloxane compound (a1) having an unsaturated group as a precursor of the silicon-containing compound (A2) is carried out using a sol-gel technique. The hydrolysis/condensation reaction of a bifunctional silane compound begins with hydrolysis of the alkoxy group or halogen atom in the presence of water to produce a silanol group (Si—OH), followed by condensation between the silanol group with another silanol group or an alkoxy group or a halogen atom. To help the hydrolysis to proceed rapidly, it is preferred to add an adequate amount of water, or a catalyst may be added. The condensation reaction proceeds even with a moisture content in air or a trace amount of water present in a solvent other than water. A solvent may be used in carrying out the reaction. Examples of suitable solvents include, but are not limited to, water and hydrophilic organic solvents, such as methanol, ethanol, n-propanol, isopropyl alcohol, n-butanol, isobutanol, acetone, methyl ethyl ketone, dioxane, and tetrahydrofuran, and mixtures of two or more thereof.

An acid or a base may be used as the catalyst. Examples of useful catalysts include inorganic acids, such as hydrochloric acid, phosphoric acid, and sulfuric acid; organic acids, such as acetic acid, p-toluenesulfonic acid, and monoisopropyl phosphate; inorganic bases, such as sodium hydroxide, potassium hydroxide, lithium hydroxide, and ammonia; amine compounds (organic bases), such as triethylamine, monoethanolamine, and diethanolamine; titanium compounds, such as tetraisopropyl titanate and tetrabutyl titanate; tin compounds, such as dibutyltin laurate and octyl stannate; boron compounds, such as trifluoroborane; aluminum compounds, such as aluminum trisacetylacetate; chlorides of metals, such as iron, cobalt, manganese, and zinc; and carboxylates, such as naphthenates and octylates, of these metals. The catalysts may be used either individually or in combination of two or more thereof. When two or more bifunctional silane compounds are hydrolyzed and condensed, they may be separately hydrolyzed to some extent and then mixed for further hydrolysis-condensation reaction, or they may be mixed together from the beginning and subjected to hydrolysis and condensation.

As previously stated, the acyclic polysiloxane compound (a1) having an unsaturated bond as a precursor is obtained by allowing the product resulting from the hydrolysis-condensation reaction to react with a monofunctional, trifunctional or tetrafunctional monosilane compound in the case where p is 1, 3 or 4, respectively, and allowing the reaction product to further react with a monofunctional silane compound having an unsaturated group. In the case where p is 2, the compound (a1) is obtained by allowing the product resulting from the hydrolysis-condensation reaction to react with a monofunctional silane compound having an unsaturated group.

The reaction between the acyclic polysiloxane compound (a1) having an unsaturated bond as a precursor and the cyclic polysiloxane compound (a2) can be achieved using a hydrosilylation reaction. For example, the silicon-containing compound (A2) is obtained by mixing the acyclic polysiloxane compound (a1) and the cyclic polysiloxane compound (a2), adding an appropriate amount of a platinum catalyst to the mixture, and heating the mixture.

The process of producing a silicon-containing compound (B2) (i.e., a compound of formula (2) wherein Z is C2-C4 alkenyl or alkynyl) is as follows.

A silicon-containing compound (B2) is obtained by, for example, starting with (b1) an acyclic polysiloxane compound as a precursor, which is caused to react with (b2) a cyclic polysiloxane compound having an unsaturated bond. The acyclic polysiloxane compound (b1) is obtainable by condensing at least one bifunctional silane compound by hydrolysis, allowing the condensate to react with a monofunctional, trifunctional or tetrafunctional monosilane compound in the case where p is 1, 3 or 4, respectively, and allowing the reaction product to react with a compound for introducing an Si—H group (hereinafter "an Si—H group-introducing compound"). The acyclic polysiloxane compound (b1) and the cyclic polysiloxane compound (b2) having an unsaturated bond are bonded to each other through the reaction between the Si—H group of (b1) and the unsaturated group of (b2). The functional group of the bifunctional silane compound is typically exemplified by an alkoxy group, a halogen atom, and a hydroxyl group.

Examples of the bifunctional silane compound that can be used in the preparation of the acyclic polysiloxane compound (b1) include dialkoxymonosilane compounds, such as dimethyldimethoxysilane, dimethyldiethoxysilane, diphenyldimethoxysilane, diphenyldiethoxysilane, methylphenyldimethoxysilane, and methylphenyldiethoxysilane; monosilane compounds derived from these dialkoxymonosilane compounds by displacing at least one of the alkoxy groups with a halogen atom selected from the group consisting of fluorine, chlorine, bromine, and iodine or a hydroxyl group; and di- or oligosiloxane compounds having two or more molecules of the monosilane compounds condensed.

Examples of the monofunctional mono silane compounds include monoalkoxysilane compounds, such as trimethylethoxysilane, trimethylmethoxysilane, triphenylethoxysilane, triphenylmethoxysilane, methyldiphenylethoxysilane, and dimethylphenylethoxysilane; and monosilane compounds derived from the monoalkoxysilane compounds by displacing the alkoxy group with a halogen atom selected from the group consisting of fluorine, chlorine, bromine, and iodine or a hydroxyl group.

Examples of the trifunctional monosilane compounds include trisalkoxysilane compounds, such as trisethoxymethylsilane, trismethoxymethylsilane, trisethoxyphenylsilane, and trismethoxyphenylsilane; and monosilane compounds derived from these trisalkoxysilane compounds by displacing at least one of the alkoxy groups with a halogen atom selected from the group consisting of fluorine, chlorine, bromine, and iodine or a hydroxyl group.

Examples of the tetrafunctional monosilane compounds include tetrakisalkoxysilane compounds, such as tetrakisethoxysilane and tetrakismethoxysilane; and monosilane compounds derived from these tetrakisalkoxysilane compounds by displacing at least one of the alkoxy groups with a halogen atom selected from the group consisting of fluorine, chlorine, bromine, and iodine or a hydroxyl group.

Examples of the cyclic polysiloxane compound (b2) having an unsaturated bond include 1,3,5-trimethyl-1,3,5-trivinylcyclotrisiloxane, 1,3,5,7-tetramethyl-1,3,5,7-tetravinylcyclotetrasiloxane, 1,3,5,7,9-pentamethyl-1,3,5,7,9-pentavinyl-cyclopentasiloxane, 1,3,5,7,9,11-hexamethyl-1,3,5,7,9,11-hexavinylcyclohexasiloxane, 1,3,5,7,9,11,13-heptamethyl-1,3,5,7,9,11,13-heptavinylcycloheptasiloxane, 1,3,5,7,9,11,13,15-octamethyl-1,3,5,7,9,11,13,15-octavinylcyclooctasiloxane, 1,3,5-triphenyl-1,3,5-trivinylcyclotrisiloxane, 1,3,5,7-tetraphenyl-1,3,5,7-tetravinyl-cyclotetrasiloxane, and 1,3,5,7,9-pentaphenyl-1,3,5,7,9-pentavinylcyclopentasiloxane.

Examples of the Si—H group-introducing compound include dimethylchlorosilane, dimethylmethoxysilane, dimethylethoxysilane, diphenylchlorosilane, diphenylmethoxysilane, diphenylethoxysilane, phenylmethylchlorosilane, phenylmethylmethoxysilane, phenylmethylethoxysilane, hydroxydimethylsilane, hydroxydiphenylsilane, and hydroxyphenylmethylsilane.

When starting with the bifunctional silane compound, monofunctional monosilane compound, trifunctional monosilane compound, tetrafunctional monosilane compound, Si—H group-introducing compound, or cyclic polysiloxane compound (b2) having an unsaturated bond with part of or the whole of the hydrogen atoms thereof replaced with deuterium and/or fluorine, there is produced a silicon-containing compound of the invention with part of or the whole of its hydrogen atoms replaced with deuterium and/or fluorine as will be described infra.

The condensation reaction by hydrolysis for obtaining the acyclic polysiloxane compound (b1) as a precursor of the silicon-containing compound (B2) is carried out using a sol-gel technique. The sol-gel reaction is carried out in the same manner as discussed above with respect to the acyclic polysiloxane compound (a1) having an unsaturated bond.

The reaction between the acyclic polysiloxane compound (b1) as a precursor and the cyclic polysiloxane compound (b2) having an unsaturated bond can be achieved using a hydrosilylation reaction. For example, the silicon-containing compound (B2) is obtained by mixing the acyclic polysiloxane compound (b1) and the cyclic polysiloxane compound (b2) having an unsaturated bond, adding an appropriate amount of a platinum catalyst to the mixture, and heating the mixture.

The silicon-containing compound of the invention is used as a main component of a curing composition as will be described infra. It is also useful as a modifier additive to other polymers or polymer compositions.

It is possible, though not included within the scope of the present invention, to introduce into the acyclic siloxane chain of the general formula (1) or (2) an element other than silicon, such as boron, magnesium, aluminum, phosphorus, titanium, zirconium, hafnium, iron, zinc, niobium, tantalum, tin, or tellurium. Such may be achieved by, for example, performing hydrolysis and condensation using a derivative supplying an element other than silicon in combination to incorporate the element into the siloxane chain. Furthermore, there are silicon-containing compounds represented by general formula (1) or (2) in which part or the whole of the hydrogen atoms displaced with deuterium and/or fluorine.

The curing composition according to the invention will then be described.

The curing composition of the invention essentially contains (A1) a silicon-containing compound of general formula (1) in which Z is a hydrogen atom, (B1) a silicon-containing compound of general formula (1) in which Z is an alkenyl or alkynyl group having 2 to 4 carbon atoms, and (C) a catalyst for hydrosilylation. The curing composition of the invention cures on reaction between Z of the silicon-containing compound (A1) and Z of the silicon-containing compound (B1) by the action of heat and the hydrosilylation catalyst (C). The silicon-containing compounds (A1) and (B1) constituting the curing composition are preferably the aforementioned silicon-containing compounds (A2) and (B2), respectively.

It is preferred that the curing composition contain 5 to 5000 parts, more preferably 10 to 1000 parts, by mass of the silicon-containing compound (B1) per 100 parts by mass of the silicon-containing compound (A1). The content of the hydrosilylation catalyst (C) in the composition is preferably 5% by mass or less, more preferably 0.0001 to 1.0% by mass, in terms of curability and storage stability. The catalyst content of more than 5% by mass can adversely affect the stability of the curing composition.

The hydrosilylation catalyst (C) for use in the invention is a known catalyst containing at least one metal selected from the group consisting of platinum, palladium, and rhodium that accelerate hydrosilylation. Examples of the platinum catalyst include a platinum-carbonylvinylmethyl complex, a platinum-divinyltetramethyldisiloxane complex, a platinum-cyclovinylmethylsiloxane complex, and a platinum-octylaldehyde complex. Examples of the palladium or rhodium catalysts include those derived from the platinum catalysts listed above by replacing platinum with palladium or rhodium as a platinum metal. These catalysts may be used either individually or in combination. Preferred of them are platinum catalysts in terms of curing properties. A platinum-carbonylvinylmethyl catalyst is particularly preferred. What we call a Wilkinson's catalyst containing the platinum metal, such as chlorotris(triphenylphosphine)rhodium (I), is also included in the hydrosilylation catalyst (C).

The curing composition of the invention may further contain (D) a compound reactive with the silicon-containing compound (A1) or (B1).

The compound (D) is an optional component that may be used for the purpose of, for example, improving adhesion. The compound (D) is a compound reactive with the Si—H group of the silicon-containing compound (A1) or a compound reactive with the alkenyl or alkynyl group of the silicon-containing compound (B1). The component (D) may be a single compound or a mixture of two or more compounds. The compound (D) is not particularly limited, but a polysiloxane compound is preferred in view of heat resistance of a cured product. Examples of the polysiloxane compound include linear or branched polydimethylsiloxanes having a vinyl group, an acetylene group, an Si—H group, etc. at both terminals thereof, linear or branched dimethylsiloxane-diphenylsiloxane random and/or block copolymers having a vinyl group, an acetylene group, an Si—H group, etc. at both terminals thereof, linear or branched polydimethylsiloxanes with part of the methyl groups thereof displaced with a group selected from a vinyl group, an acetylene group, and an Si—H group; linear or branched dimethylsiloxane-diphenylsiloxane random and/or block copolymers with part of the methyl or phenyl groups thereof displaced with a group selected from a vinyl group, an acetylene group, and an Si—H group, and resins having a vinyl group, an acetylene group, an Si—H group, and the like.

The amount of the compound (D) is preferably 5% to 95%, more preferably 10% to 75%, by mass based on the sum of the components (A) and (B). If used in an amount exceeding 95%, the compound (D) can reduce flexibility and heat resistance. At amounts less than 5%, a sufficient effect of use is not produced.

The curing composition of the invention may further contain (E) a metal oxide fine powder.

The metal oxide fine powder (E) is an optional component that may be used to improve various properties after cure. Examples of the metal oxide fine powder (E) include fillers and inorganic materials such as minerals, and organically modified products thereof. Specific examples include silicon dioxides, such as colloidal silica, a silica filler, and silica gel; metal oxides, such as aluminum oxide, zinc oxide, and titanium oxide; minerals, such as mica, montmorillonite, siliceous stone, diatomaceous earth, sericite, kaolinite, flint clay, feldspar, vermiculite, attapulgite, talc, minnesotite, and pyrophyllite; and their organically modified products. In applications where high insulating properties are required, such as a sealant or an insulator in electronic components, electronic circuitry, and the like, preferred among them are silicon dioxides and aluminum oxide. The organic modification of the metal oxide fine powder may be carried out by surface treatment with, for example, an organic silane coupling agent having an alkoxysilane or chlorosilane functional group.

The average particle size of the metal oxide fine powder (E) is preferably not greater than 500 more preferably 200 μm or smaller, in terms of heat resistance. The smaller, the better. The content of the metal oxide fine powder (E) in the curing composition is preferably 0.1% to 95%, more preferably 1% to 90%, by mass in terms of heat resistance and handling properties.

Using the metal oxide fine powder (E) allows for controlling the viscosity and thixotropy of the curing composition. For instance, an increased content of the metal oxide fine powder (E) results in an increased viscosity, and a smaller average particle size results in increased thixotropy. In particular, use of particles with an average (primary) particle size smaller than 100 nm is effective because an increased viscosity and high thixotropy will be imparted with a small amount of addition.

The curing composition may optionally contain a weathering stabilizer. Well-known types of weathering stabilizers may be used, such as light stabilizers, ultraviolet absorbers, phenol antioxidants, sulfur antioxidants, and phosphorus antioxidants. Useful light stabilizers are hindered amines. Examples of useful UV absorbers are 2-hydroxybenzophenones, 2-(2-hydroxyphenyl)benzotriazoles, 2-(2-hydroxyphenyl)-4,6-diaryl-1,3,5-triazines, benzoates, and cyanoacrylates. Examples of the phenol antioxidants include triethylene glycol bis[3-(3-t-butyl-5-methyl-4-hydroxyphenyl)propionate], dibutylhydroxytoluene (BHT), and 2,6-di-t-butyl-p-cresol (DBPC). Examples of the sulfur antioxidants are dialkyl thiodipropionates and β-alkylmercaptopropionic esters. Examples of the phosphorus antioxidants are organic phosphites.

The content of the weathering stabilizer, if used, in the curing composition is preferably 0.0001% to 50%, more preferably 0.001% to 10%, by mass in view of heat resistance, electrical characteristics, curing properties, mechanical characteristics, storage stability, and handling properties.

The curing composition may contain other known resins, additives, fillers, and so on as long as the performance properties aimed at by the invention are not impaired. Examples of optionally usable resins include polyimide resins, polyether resins (such as polyethylene glycol and polypropylene glycol), polyurethane resins, epoxy resins, phenol resins, polyester resins, melamine resins, polyamide resins, and polyphenylene sulfide resins. Optionally usable additives include antistatics.

The total content of the optional components other than the silicon-containing compound (A1), the silicon-containing compound (B1), the hydrosilylation catalyst (C), the compound (D), and the metal oxide fine powder (E) is preferably 10% by mass or less in the curing composition so as not to damage the performance aimed at by the invention.

The curing composition of the invention exhibits good handling properties with good flowability at room temperature (25° C.). With reference to flowability, the curing composition containing no metal oxide fine powder (E) preferably has a viscosity of 50 Pa·S or less, more preferably 10 Pa·S or less, at room temperature (25° C.) as measured with an E-type viscometer, i.e. cone-plate viscometer.

A cured product of the curing composition of the invention is excellent in heat resistance and crack resistance. More specifically, the curing composition advantageously produces a cured product that shows a 5% mass loss temperature of 300° C. or higher, preferably 400° C. or higher, and a cured product with reduced cracking.

The cured product of the invention is a product resulting from curing the curing composition of the invention. The heating temperature for curing is preferably 0° to 300° C., more preferably 100° to 200° C. The curing time is preferably 0.1 to 10 hours, more preferably 0.5 to 6 hours. When cured under these conditions, the curing composition of the invention produces a cured product with superior performance properties, such as heat resistance and crack resistance.

The cured product of the invention exhibits superior physical properties, particularly mechanical characteristics, optical characteristics, electrical characteristics and so on, such as transparency, heat resistance, crack resistance, solvent resistance, alkali resistance, weather resistance, stain resistance, flame retardance, moisture resistance, gas barrier properties, flexibility, elongation and strength, electrical insulating properties, low dielectric constant, etc.

The curing composition of the invention, which contains the silicon-containing compounds of the invention, is excellent in stability and curing properties, and a cured product obtained therefrom is excellent in various physical properties, such as crack resistance, heat resistance, solvent resistance, alkali resistance, weather resistance, optical characteristics, and electrical characteristics. The curing composition of the invention is applicable to the electrical and electronic material fields as a sealing compound for display materials, optical materials, recording materials, semiconductors, etc., a high voltage insulating compound, a potting/sealing compound for insulation, vibration absorption, waterproofing or moistureproofing, a prototype mold material for plastic parts, a coating material, an interlayer insulator, insulating packing, a heat shrinkable rubber tube, an O-ring, a sealant or protector for display devices, an optical waveguide, an optical fiber protector, an optical lens, an adhesive for optical devices, a high heat resistant adhesive, a high heat dissipative material, a high heat resistant sealant, a solar cell or fuel cell member, a solid electrolyte for batteries, an insulating coating material, a photosensitive drum for copiers, and a gas separation membrane. It is also applicable to the civil engineering and construction fields as a concrete protector, a lining, a soil conditioner, a sealing compound, a cool or heat storage medium, a glass coating material, etc., and to the medical material field as a tube, a sealant, a coating compound, a sealing compound for sterilizers, contact lenses, an oxygen enrichment membrane, and so forth.

EXAMPLES

The present invention will now be illustrated in greater detail with reference to Examples, but it should be understood that the invention is not construed as being limited thereto. In Examples, all the parts and percents are given by mass.

Synthesis Example 1

Ninety parts of dichlorodimethylsilane and 9 parts of dichlorodiphenylsilane were mixed, and the mixture was added dropwise to a mixture of 100 parts of ion exchanged water, 50 parts of toluene, and 450 parts of a 48% aqueous solution of sodium hydroxide and allowed to polymerize at 105° C. for 5 hours. The resulting reaction solution was washed with 500 parts of ion exchanged water. The toluene solution was dehydrated, and 20 parts of pyridine was added thereto. Twenty parts of dimethylvinylchlorosilane was further added thereto, followed by stirring at 70° C. for 30 minutes. The reaction mixture was washed with 100 parts of ion exchanged water and freed of the solvent by evaporation under reduced pressure at 150° C. The residue was washed with 100 parts of acetonitrile and freed of the solvent by evaporation under reduced pressure at 70° C. to give acyclic polysiloxane compound (a1-1) having an unsaturated bond. GPC analysis under the following conditions revealed that the acyclic polysiloxane compound (a1-1) having an unsaturated bond had a molecular weight Mw of 20,000. The GPC in this and other examples was carried out using the following conditions.
(GPC Analysis Conditions)
Column: TSK-gel Multipore HXL M (7.8 mm×300 mm), available from Tosoh Corporation
Developing solvent: tetrahydrofuran Example 1

In 200 parts of toluene was dissolved 100 parts of the acyclic polysiloxane compound (a1-1) having an unsaturated bond obtained in Synthesis Example 1. To the solution were added 0.003 parts of a platinum catalyst and 10 part of 1,3,5,7-tetramethylcyclotetrasiloxane as a cyclic polysiloxane compound to conduct reaction at 105° C. for 2 hours. The solvent was removed by evaporation under reduced pressure at 70° C., and the residue was washed with 100 parts of acetonitrile. The solvent was removed by evaporation under reduced pressure at 70° C. to give silicon-containing compound (A-1). The Mw of the silicon-containing compound (A-1) was found to be 22,000 as a result of GPC analysis.

Synthesis Example 2

Ninety parts of dichlorodimethylsilane and 9 parts of dichlorodiphenylsilane were mixed, and the mixture was added dropwise to a mixture of 100 parts of ion exchanged water, 50 parts of toluene, and 450 parts of a 48% aqueous solution of sodium hydroxide and allowed to polymerize at 105° C. for 5 hours. The resulting reaction solution was washed with 500 parts of ion exchanged water. The toluene solution was dehydrated, and 20 parts of pyridine was added thereto. Twenty parts of dimethylchlorosilane was further added thereto, followed by stirring at 70° C. for 30 minutes. The reaction mixture was washed with 100 parts of ion exchanged water and freed of the solvent by evaporation under reduced pressure at 150° C. The residue was washed with 100 parts of acetonitrile and freed of the solvent by evaporation under reduced pressure at 70° C. to give acyclic polysiloxane compound (b1-1). The acyclic polysiloxane compound (b1-1) was found to have a molecular weight Mw of 20,000 as a result of GPC.

Example 2

In 200 parts of toluene was dissolved 100 parts of the acyclic polysiloxane compound (b1-1) obtained in Synthesis Example 2. To the solution were added 0.003 parts of a platinum catalyst and 10 part of 1,3,5,7-tetramethyl-1,3,5,7-tetravinylcyclotetrasiloxane as a cyclic polysiloxane compound having an unsaturated bond to conduct reaction at 105° C. for 2 hours. The solvent was removed by evaporation under reduced pressure at 70° C., and the residue was washed with 100 parts of acetonitrile. The solvent was removed by evaporation under reduced pressure at 70° C. to give silicon-containing compound (B-1). The Mw of the silicon-containing compound (B-1) was found to be 22,000 as a result of GPC analysis.

Synthesis Example 3

Ninety parts of dichlorodimethylsilane and 9 parts of dichlorodiphenylsilane were mixed, and the mixture was added dropwise to a mixture of 100 parts of ion exchanged water, 50 parts of toluene, and 450 parts of a 48% aqueous solution of sodium hydroxide and allowed to polymerize at 105° C. for 5 hours. The resulting reaction solution was washed with 500 parts of ion exchanged water. The toluene solution was dehydrated, and 20 parts of pyridine and then 0.5 parts of phenyltrichlorosilane were added thereto, followed by stirring at room temperature for 30 minutes and then at 70° C. for 30 minutes. The resulting reaction solution was divided into halves.

To one of the halves was added 2.5 parts of dimethylvinylchlorosilane as a monofunctional silane compound having an unsaturated bond, followed by stirring at room temperature for 30 minutes and then at 70° C. for 30 minutes. The reaction mixture was washed with ion exchanged water to remove pyridine hydrochloride thereby to yield acyclic polysiloxane compound (a1-2) having an unsaturated bond.

To the other half was added 2.5 parts of dimethylchlorosilane as an Si—H group-introducing compound, followed by stirring at room temperature for 30 minutes and then at 70° C. for 30 minutes. The reaction mixture was washed with ion exchanged water to remove pyridine hydrochloride thereby to yield acyclic polysiloxane compound (b1-2).

Example 3

In 200 parts of toluene was dissolved 100 parts of the acyclic polysiloxane compound (a1-2) obtained in Synthesis Example 3. To the solution were added 0.003 parts of a platinum catalyst and 10 part of 1,3,5,7-tetramethylcyclotetrasiloxane as a cyclic polysiloxane compound to conduct reaction at 105° C. for 2 hours. The solvent was removed by evaporation under reduced pressure at 70° C., and the residue was washed with 100 parts of acetonitrile. The solvent was removed by evaporation under reduced pressure at 70° C. to give silicon-containing compound (A-2). The Mw of the silicon-containing compound (A-2) was found to be 42,000 as a result of GPC analysis.

Example 4

In 200 parts of toluene was dissolved 100 parts of the acyclic polysiloxane compound (b1-2) obtained in Synthesis Example 3. To the solution were added 0.003 parts of a platinum catalyst and 10 part of 1,3,5,7-tetramethyl-1,3,5,7-tetravinylcyclotetrasiloxane as a cyclic polysiloxane compound having an unsaturated bond to conduct reaction at 105° C. for 2 hours. The solvent was removed by evaporation under reduced pressure at 70° C., and the residue was washed with 100 parts of acetonitrile. The solvent was removed by evaporation under reduced pressure at 70° C. to give silicon-containing compound (B-2). The Mw of the silicon-containing compound (B-2) was found to be 42,000 as a result of GPC analysis.

Synthesis Example 4

Ninety parts of dichlorodimethylsilane and 9 parts of dichlorodiphenylsilane were mixed, and the mixture was added dropwise to a mixture of 100 parts of ion exchanged water, 50 parts of toluene, and 450 parts of a 48% aqueous solution of sodium hydroxide and allowed to polymerize at 105° C. for 5 hours. The resulting reaction solution was washed with 500 parts of ion exchanged water. The toluene solution was dehydrated, and 20 parts of pyridine and then 0.5 parts of tetrachlorosilane were added thereto, followed by stirring at room temperature for 30 minutes and then at 70° C. for 30 minutes. The resulting reaction solution was divided into halves.

To one of the halves was added 2.5 parts of dimethylvinylchlorosilane as a monofunctional silane compound having an unsaturated bond, followed by stirring at room temperature for 30 minutes and then at 70° C. for 30 minutes. The reaction mixture was washed with ion exchanged water to remove pyridine hydrochloride thereby to yield acyclic polysiloxane compound (a1-3) having an unsaturated bond.

To the other half was added 2.5 parts of dimethylchlorosilane as an Si—H group-introducing compound, followed by stirring at room temperature for 30 minutes and then at 70° C. for 30 minutes. The reaction mixture was washed with ion exchanged water to remove pyridine hydrochloride thereby to yield acyclic polysiloxane compound (b1-3).

Example 5

In 200 parts of toluene was dissolved 100 parts of the acyclic polysiloxane compound (a1-3) having an unsaturated bond obtained in Synthesis Example 4. To the solution were added 0.003 parts of a platinum catalyst and 10 part of 1,3,5, 7-tetramethylcyclotetrasiloxane as a cyclic polysiloxane compound to conduct reaction at 105° C. for 2 hours. The solvent was removed by evaporation under reduced pressure at 70° C., and the residue was washed with 100 parts of acetonitrile. The solvent was removed by evaporation under reduced pressure at 70° C. to give silicon-containing compound (A-3). The Mw of the silicon-containing compound (A-3) was found to be 52,000 as a result of GPC analysis.

Example 6

In 200 parts of toluene was dissolved 100 parts of the acyclic polysiloxane compound (b1-3) obtained in Synthesis Example 4. To the solution were added 0.003 parts of a platinum catalyst and 10 part of 1,3,5,7-tetramethyl-1,3,5,7-vinylcyclotetrasiloxane as a cyclic polysiloxane compound having an unsaturated bond to conduct reaction at 105° C. for 2 hours. The solvent was removed by evaporation under reduced pressure at 70° C., and the residue was washed with 100 parts of acetonitrile. The solvent was removed by evaporation under reduced pressure at 70° C. to give silicon-containing compound (B-3). The Mw of the silicon-containing compound (B-3) was found to be 52,000 as a result of GPC analysis.

Example 7

Fifty parts of the silicon-containing compound (A-1) obtained in Example 1 and 50 parts of the silicon-containing compound (B-1) obtained in Example 2 were mixed, and 0.005 parts of a platinum-carbonylvinylmethyl complex was added thereto as a hydrosilylation catalyst (C) to obtain curing composition No. 1.

Example 8

Twenty parts of the silicon-containing compound (A-1) obtained in Example 1, 50 parts of the silicon-containing compound (B-1) obtained in Example 2, and 30 parts of a silica filler (silicon dioxide, average particle size: 10 μm) were mixed, and 0.005 parts of a platinum-carbonylvinylmethyl complex was added thereto as a hydrosilylation catalyst (C) to obtain curing composition No. 2.

Example 9

Fifteen parts of the silicon-containing compound (A-1) obtained in Example 1, parts of the silicon-containing compound (B-1) obtained in Example 2, 15 parts of a polysiloxane prepared by random polycondensation of dimethyldimethoxysilane and vinylmethyldimethoxysilane as monomers (Mw: 30,000; vinyl group content: 3.5 mmol/g), 15 parts of a polysiloxane prepared by random polycondensation of dimethyldimethoxysilane and methyldimethoxysilane as monomers (Mw: 30,000; Si—H group content: 3.5 mmol/g), and 30 parts of a silica filler (silicon dioxide; average particle size: 10 μm) were mixed, and 0.005 parts of a platinum-carbonylvinylmethyl complex was mixed therein as a hydrosilylation catalyst (C) to provide curing composition No. 3.

Example 10

Fifteen parts of the silicon-containing compound (A-1) obtained in Example 1, parts of the silicon-containing compound (B-1) obtained in Example 2, 15 parts of a polysiloxane resin prepared by random polycondensation of vinyltrimethoxysilane, methyltrimethoxysilane, and dimethyldimethoxysilane as monomers at a molar ratio of 1:4:5 (Mw: 30,000; vinyl group content: 3.5 mmol/g), 15 parts of a polysiloxane resin prepared by random polycondensation of trimethoxysilane, methyltrimethoxysilane, and dimethyldimethoxysilane as monomers at a molar ratio of 1:4:5 (Mw: 30,000; Si—H group content: 3.5 mmol/g), and 30 parts of a silica filler (silicon dioxide; average particle size: 10 μm) were mixed, and 0.005 parts of a platinum-carbonylvinylmethyl complex was mixed therein as a hydrosilylation catalyst (C) to provide curing composition No. 4.

Example 11

Fifty parts of the silicon-containing compound (A-2) obtained in Example 3 and 50 parts of the silicon-containing compound (B-2) obtained in Example 4 were mixed, and 0.005 parts of a platinum-carbonylvinylmethyl complex was mixed therein as a hydrosilylation catalyst (C) to give curing composition No. 5.

Example 12

Fifty parts of the silicon-containing compound (A-3) obtained in Example 5 and 50 parts of the silicon-containing compound (B-3) obtained in Example 6 were mixed, and 0.005 parts of a platinum-carbonylvinylmethyl complex was mixed therein as a hydrosilylation catalyst (C) to give curing composition No. 6.

Comparative Example 1

Fifty parts of the acyclic polysiloxane compound (a1-1) having an unsaturated bond obtained in Synthesis Example 1 and 50 parts of the acyclic polysiloxane compound (b1-1) obtained in Synthesis Example 3 were mixed, and 0.005 parts of a platinum-carbonylvinylmethyl complex was mixed therein as a curing catalyst to give a comparative curing composition designated Comp. No. 1.

Comparative Example 2

Fifty parts of a polysiloxane prepared by random polycondensation of dimethyldimethoxysilane and vinylmethyldimethoxysilane as monomers (Mw: 30,000; vinyl group content: 3.5 mmol/g) and 50 parts of a polysiloxane prepared by random polycondensation of dimethyldimethoxysilane and methyldimethoxysilane as monomers (Mw: 30,000; Si—H group content: 3.5 mmol/g) were mixed, and 0.005 parts of a platinum-carbonylvinylmethyl complex was mixed therein as a curing catalyst to provide a comparative curing composition designated Comp. No. 2.

Comparative Example 3

Fifty parts of a polysiloxane resin prepared by random polycondensation of vinyltrimethoxysilane, methyltrimethoxysilane, and dimethyldimethoxysilane as monomers at a molar ratio of 1:4:5 (Mw: 30,000; vinyl group content: 3.5 mmol/g) and 50 parts of a polysiloxane resin prepared by random polycondensation of trimethoxysilane, methyltrimethoxysilane, and dimethyldimethoxysilane as monomers at a molar ratio of 1:4:5 (Mw: 30,000; Si—H group content: 3.5 mmol/g) were mixed, and 0.005 parts of a platinum-carbonylvinylmethyl complex was mixed therein as a curing catalyst to provide a comparative curing composition designated Comp. No. 3.

Comparative Example 4

Fifty parts of the silicon-containing compound (A-1) obtained in Example 1 and 50 parts of polydimethylsiloxane having a vinyl group at both terminals (Mw: 20,000) were mixed, and 0.005 parts of a platinum-carbonylvinylmethyl complex was mixed therein as a curing catalyst to prepare a comparative curing composition designated Comp. No. 4.

Comparative Example 5

Fifty parts of the silicon-containing compound (B-1) obtained in Example 2 and 50 parts of polydimethylsiloxane having an Si—H group at both terminals (Mw: 20,000) were mixed, and 0.005 parts of a platinum-carbonylvinylmethyl complex was mixed therein as a curing catalyst to prepare a comparative curing composition designated Comp. No. 5.

Comparative Example 6

Ninety parts of dichlorodimethylsilane and 9 parts of dichlorodiphenylsilane were mixed, and the mixture was added dropwise to a mixture of 100 parts of ion exchanged water, 50 parts of toluene, and 450 parts of a 48% aqueous solution of sodium hydroxide, followed by polymerization at 105° C. for 5 hours. The reaction solution was washed with 500 parts of ion exchanged water, and the resulting toluene solution was dehydrated. Twenty parts of pyridine and then 0.005 parts of phenyltrichlorosilane were added thereto, followed by stirring at 70° C. for 120 minutes. The reaction solution was divided into halves.

To one of the halves was added 10 parts of dimethylvinylchlorosilane as a monofunctional silane compound having an unsaturated bond, followed by stirring at room temperature for 30 minutes and then at 70° C. for 30 minutes. The reaction mixture was washed with ion exchanged water to remove pyridine hydrochloride. The solvent was removed by evaporation under reduced pressure at 150° C. to give acyclic polysiloxane compound (a1-4) having an unsaturated bond.

To the other half was added 10 parts of dimethylchlorosilane as an Si—H group-introducing compound, followed by stirring at room temperature for 30 minutes and then at 70° C. for 30 minutes. The reaction mixture was washed with ion exchanged water to remove pyridine hydrochloride. The solvent was evaporated off under reduced pressure at 150° C. to give acyclic polysiloxane compound (b1-4) having an Si—H group.

As a result of GPC analysis, the acyclic polysiloxane compound (a1-4) having an unsaturated bond and the acyclic polysiloxane compound (b1-4) were both found to have an Mw of 20,000.

Fifty parts of the acyclic polysiloxane compound (a1-4) having an unsaturated bond and 50 parts of the acyclic polysiloxane compound (b1-4) were mixed, and 0.005 parts of a platinum-carbonylvinylmethyl complex was added thereto as a curing catalyst to prepare a comparative curing composition designated Comp. No. 6.

Examples 13 to 18 and Comparative Examples 7 to 12

Each of the curing composition Nos. 1 to 6 obtained in Examples 7 to 12 and the comparative curing compositions (Comp. Nos. 1 to 6) obtained in Comparative Examples 1 to 6 was applied to an aluminum plate to form a film with a thickness of about 1 mm and heated at 150° C. for 30 minutes to form a cured film Nos. 1 to 6 and comparative cured films Comp. Nos. 1 to 6. The numbers of the curing compositions correspond to those of the cured films. The cured films were evaluated in terms of cured state and by a heat resistance test and 180° bending test as follows.

The cured state was evaluated in terms of tack of the cured film after a prescribed cure time. A tack-free film was rated "very good", and a flowable film was rated "bad". A film that was not flowable but tacky was rated "good" or "medium" according to the degree of tackiness.

In a heat resistant test a 5% mass loss temperature was determined by TG/DTA in air.

In a 180° bending test, a cured film with a thickness of about 1 mm as formed on an aluminum substrate was bent 180° and observed at the bend. A film showing no cracking nor peeling was rated "good". A film that underwent cracking when bent 180° but showed no cracking nor peeling at 90° bending was rated "medium". A film that underwent cracking when bent 90° was rated "bad".

The results obtained are shown in Table 1.

TABLE 1

|  | Cured Film | Cured State | 5% Mass Loss Temp. | 180° Bending Test |
|---|---|---|---|---|
| Example 13 | No. 1 | very good | 375° C. | good |
| Example 14 | No. 2 | very good | 405° C. | good |
| Example 15 | No. 3 | very good | 400° C. | good |
| Example 16 | No. 4 | very good | 410° C. | good |
| Example 17 | No. 5 | very good | 380° C. | good |
| Example 18 | No. 6 | very good | 380° C. | good |
| Comp. Example 7 | Comp. No. 1 | bad | not measured | not tested |
| Comp. Example 8 | Comp. No. 2 | very good | 330° C. | bad |
| Comp. Example 9 | Comp. No. 3 | very good | 340° C. | medium |
| Comp. Example 10 | Comp. No. 4 | good | 350° C. | medium |
| Comp. Example 11 | Comp. No. 5 | good | 350° C. | medium |
| Comp. Example 12 | Comp. No. 6 | medium | 370° C. | good |

The cured film Nos. 1 to 6 of Examples 13 to 18 are equal or superior in cured state, superior in 5% mass loss temperature, and equal or superior in 180° bending test to Comp. Nos. 1 to 6 of Comparative Examples 7 to 12. The curing composition Comp. No. 1 failed to provide a sufficiently solid cured film. It has now confirmed by these results that the present invention provides improvement in cured state, heat resistance, and flexibility. In particular, comparison between Example 13 and Comparative Examples 7 and 12 proves that the cyclopolysiloxane skeleton having a reaction site, which structure is characteristic of the invention, greatly contributes to the improvement of cured state. Furthermore, the results of Examples 14 to 16 demonstrate that addition of a silica filler as a metal oxide fine powder brings about further improvement on heat resistance while retaining the good curing properties and flexibility.

Example 19

Twenty-five parts of the silicon-containing compound (A-1) obtained in Example 1, 25 parts of the silicon-containing compound (B-1) obtained in Example 2, and 50 parts of a silica filler (silicon dioxide; average particle size: 10 μm) were mixed, and 0.0025 parts of a platinum-carbonylvinylmethyl complex was mixed therein as a hydrosilylation catalyst (C) to provide curing composition No. 7.

Example 20

Ten parts of the silicon-containing compound (A-1) obtained in Example 1, 10 parts of the silicon-containing compound (B-1) obtained in Example 2, and 50 parts of an alumina filler (a mixture of 40 mass % of particles with an average particle size of 5 μm, 20 mass % of particles with an average particle size of 20 μm, and 40 mass % of particles with an average particle size of 100 μm) were mixed, and 0.001 part of a platinum-carbonylvinylmethyl complex was mixed therein as a hydrosilylation catalyst (C) to provide curing composition No. 8.

Example 21

Forty-seven parts of the silicon-containing compound (A-1) obtained in Example 1, 47 parts of the silicon-containing compound (B-1) obtained in Example 2, and 6 parts of a silica filler (Aerosil R805 from Nippon Aerosil Co., Ltd.; silicon dioxide having been surface treated with octylsilane; average primary particle size: 12 nm) were mixed, and 0.0047 parts of a platinum-carbonylvinylmethyl complex was mixed therein as a hydrosilylation catalyst (C) to provide curing composition No. 9.

Examples 22 to 25

The viscosity of each of the curing composition Nos. 1 and 7 to 9 obtained in Examples 7 and 19 to 21 was measured with an E-type viscometer, i.e. cone-plate viscometer, at 25° C. Furthermore, a thixotropic index of each curing composition was determined, the thixotropic index being defined to be the ratio of the viscosity measured with an E-type viscometer at 5 rpm to that measured at 20 rpm (the viscosity at 5 rpm/the viscosity at 20 rpm).

Each curing composition weighing 0.5 g was cast on a glass substrate using a dropper, heated up to 200° C. at a rate of 25° C./min and maintained at that temperature for 1 hour to obtain a cured film numbered 7 to 10. The diameter of the cured film was measured. The linear expansion coefficient of the cured film was determined by TMA. The results obtained are shown in Table 2.

TABLE 2

|  | Curing Composition | Viscosity (mPas) | Thixotropic Index | Cured Film | Diameter (mm) | Linear Expansion Coefficient (ppm) |
|---|---|---|---|---|---|---|
| Example 22 | No. 1 | 2000 | 1.0 | No. 7 | 50 | 400 |
| Example 23 | No. 7 | 15000 | 1.1 | No. 8 | 40 | 300 |
| Example 24 | No. 8 | 21000 | 1.2 | No. 9 | 35 | 150 |

TABLE 2-continued

| | Curing Composition | Viscosity (mPas) | Thixotropic Index | Cured Film | Diameter (mm) | Linear Expansion Coefficient (ppm) |
|---|---|---|---|---|---|---|
| Example 25 | No. 9 | 10000 | 1.5 | No. 10 | 20 | 400 |

Comparison between the results of curing composition No. 1 containing no metal oxide fine powder (E) and those of curing composition Nos. 7 to 9 containing a metal oxide fine powder (E) in Table 2 provides confirmation that using a metal oxide fine powder (E) allows for higher viscosity and thixotropy in control. It was also confirmed that using the metal oxide fine powder (E) allows for lower linear expansion coefficient of a cured product in control.

INDUSTRIAL APPLICABILITY

The present invention provides a curing composition excellent in handling properties and curing properties, a cured product excellent in heat resistance and flexibility, and a silicon-containing compound providing the curing composition and the cured product.

The invention claimed is:

1. A silicon-containing compound represented by general formula (1):

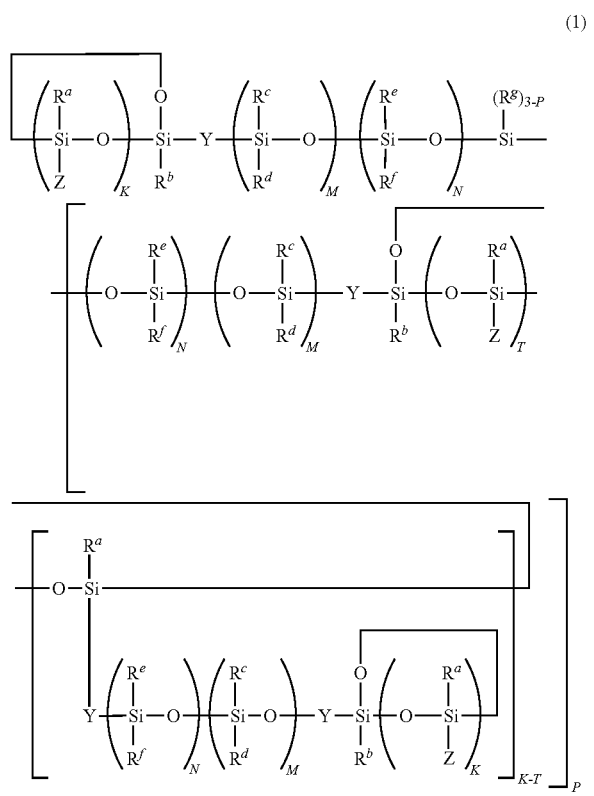

wherein $R^a$, $R^b$, $R^c$, $R^d$, $R^e$, $R^f$, and $R^g$, which may be the same or different, each represent a saturated aliphatic hydrocarbon group having 1 to 12 carbon atoms or an aromatic hydrocarbon group optionally substituted with a saturated aliphatic hydrocarbon group and having 6 to 12 carbon atoms, provided that $R^e$ and $R^f$ do not simultaneously represent a saturated aliphatic hydrocarbon group having 1 to 12 carbon atoms; Y represents an alkylene group having 2 to 4 carbon atoms; Z represents a hydrogen atom or an alkenyl or alkynyl group having 2 to 4 carbon atoms; K represents a number of 2 to 7; T represents a number of 1 to 7; the unit recurring T times and the unit recurring (K-T) times may be bonded to each other blockwise or randomly; P represents a number of 0 to 3; M and N represent numbers selected such that N:M ranges from 1:1 to 1:100, that all M's and N's total at least 15, and that the silicon-containing compound represented by general formula (1) has a mass average molecular weight of 3,000 to 1,000,000; and the unit recurring M times and the unit recurring N times may be bonded to each other blockwise or randomly.

2. A silicon-containing compound represented by general formula (2):

$$\left[\left(\begin{array}{c}R^a\\|\\Si-O\\|\\Z\end{array}\right)_k-\begin{array}{c}O\\|\\Si-Y\\|\\R^b\end{array}-\left(\begin{array}{c}R^c\\|\\Si-O\\|\\R^d\end{array}\right)_m\left(\begin{array}{c}R^e\\|\\Si-O\\|\\R^f\end{array}\right)_n\right]_p-Si-(R^g)_{4-p}$$

wherein $R^a$, $R^b$, $R^c$, $R^d$, $R^e$, $R^f$, and $R^g$, which may be the same or different, each represent a saturated aliphatic hydrocarbon group having 1 to 12 carbon atoms or an aromatic hydrocarbon group optionally substituted with a saturated aliphatic hydrocarbon group and having 6 to 12 carbon atoms, provided that $R^e$ and $R^f$ do not simultaneously represent a saturated aliphatic hydrocarbon group having 1 to 12 carbon atoms; Y represents an alkylene group having 2 to 4 carbon atoms; Z represents a hydrogen atom or an alkenyl or alkynyl group having 2 to 4 carbon atoms; k represents a number of 2 to 7; p represents a number of 1 to 4; m and n represent numbers selected such that n:m ranges from 1:1 to 1:100, that m+n is equal to or greater than 15, and that the silicon-containing compound represented by general formula (2) has a mass average molecular weight of 3,000 to 1,000,000; and the unit recurring m times and the unit recurring n times may be bonded to each other blockwise or randomly.

3. A curing composition comprising (A1) the silicon-containing compound of general formula (1) wherein Z is a hydrogen atom according to claim 1, (B1) the silicon-containing compound of general formula (1) wherein Z is an alkenyl or alkynyl group having 2 to 4 carbon atoms according to claim 1, and (C) a catalyst for hydrosilylation.

4. A curing composition comprising (A2) the silicon-containing compound of general formula (2) wherein Z is a hydrogen atom according to claim 2, (B2) the silicon-containing compound of general formula (2) wherein Z is an alkenyl or alkynyl group having 2 to 4 carbon atoms according to claim 2, and (C) a catalyst for hydrosilylation.

5. The curing composition according to claim 3, further comprising (D) a compound reactive with the silicon-containing compound as component (A1) or (B1) or the silicon-containing compound as component (A2) or (B2).

6. The curing composition according to claim 3, further comprising (E) a metal oxide fine powder.

7. The curing composition according to claim 6, wherein the metal oxide fine powder (E) is a silicon dioxide.

8. The curing composition according to claim 6, wherein the metal oxide fine powder (E) is aluminum oxide.

9. A cured product obtained by curing the curing composition according to claim 3.

10. The curing composition according to claim 4, further comprising (D) a compound reactive with the silicon-containing compound as component (A1) or (B1) or the silicon-containing compound as component (A2) or (B2).

11. The curing composition according to claim 4, further comprising (E) a metal oxide fine powder.

12. The curing composition according to claim 5, further comprising (E) a metal oxide fine powder.

13. A cured product obtained by curing the curing composition according to claim 4.

14. A cured product obtained by curing the curing composition according to claim 5.

15. A cured product obtained by curing the curing composition according to claim 6.

16. A cured product obtained by curing the curing composition according to claim 7.

17. A cured product obtained by curing the curing composition according to claim 8.

* * * * *